United States Patent
Ilchev

(10) Patent No.: US 12,487,637 B2
(45) Date of Patent: Dec. 2, 2025

(54) ELECTRONIC DEVICE PACKAGING SYSTEM BUILT OF USABLE COMPONENTS COMPLEMENTING THE FUNCTIONALITY OF THE DEVICE

(71) Applicant: Petyo Ilchev, Sofia (BG)

(72) Inventor: Petyo Ilchev, Sofia (BG)

( * ) Notice: Subject to any disclaimer, the term of this patent is extended or adjusted under 35 U.S.C. 154(b) by 151 days.

(21) Appl. No.: 18/683,481

(22) PCT Filed: Sep. 1, 2022

(86) PCT No.: PCT/IB2022/058223
§ 371 (c)(1),
(2) Date: Feb. 13, 2024

(87) PCT Pub. No.: WO2023/031851
PCT Pub. Date: Mar. 9, 2023

(65) Prior Publication Data
US 2024/0353898 A1    Oct. 24, 2024

(30) Foreign Application Priority Data

Sep. 3, 2021 (BG) .............................. 5374

(51) Int. Cl.
| | |
|---|---|
| G06F 1/16 | (2006.01) |
| B65D 8/00 | (2006.01) |
| G06F 3/039 | (2013.01) |
| H04R 1/02 | (2006.01) |
| H04R 1/10 | (2006.01) |

(52) U.S. Cl.
CPC .......... *G06F 1/1632* (2013.01); *B65D 15/02* (2013.01); *G06F 1/1635* (2013.01); *G06F 3/0395* (2013.01); *H04R 1/028* (2013.01); *H04R 1/1025* (2013.01); *B65D 2585/684* (2013.01); *B65D 2585/86* (2013.01); *H04R 1/1016* (2013.01); *H04R 2499/11* (2013.01)

(58) Field of Classification Search
CPC ..... G06F 1/1632; G06F 1/1635; B65D 15/02; H04R 1/028; H04R 1/1025
USPC ................. 381/333, 87, 332, 301, 306, 388
See application file for complete search history.

(56) References Cited

U.S. PATENT DOCUMENTS

| | | | |
|---|---|---|---|
| 2016/0118179 A1* | 4/2016 | Park ........................ | H01F 38/14 320/108 |
| 2017/0264987 A1* | 9/2017 | Hong ................... | H04R 1/1091 |

FOREIGN PATENT DOCUMENTS

| | | |
|---|---|---|
| BG | 4141 U1 | 10/2021 |
| KR | 20120072296 A | 7/2012 |

(Continued)

OTHER PUBLICATIONS

International Search Report and Written Opinion for International Application No. PCT/IB2022/058223, dated Nov. 28, 2022.

*Primary Examiner* — Thjuan K Addy
(74) *Attorney, Agent, or Firm* — MARSHALL, GERSTEIN & BORUN LLP

(57) ABSTRACT

The invention refers to an eco-friendly package for electronic device built of usable components complementing the functionality. The package comprises a geometrically connected first connecting element (1A, 1B) comprising a sound reproduction means, connected to one side of an intermediate connecting element (2) being a flat and flexible component, which at its other side is connected to a second connecting element (4), being a device for charging an electronic device.

5 Claims, 2 Drawing Sheets

(56) References Cited

FOREIGN PATENT DOCUMENTS

WO     WO-2013/166326 A1    11/2013
WO     WO-2017/201500 A1    11/2017

\* cited by examiner

ELECTRONIC DEVICE PACKAGING SYSTEM BUILT OF USABLE COMPONENTS COMPLEMENTING THE FUNCTIONALITY OF THE DEVICE

CROSS-REFERENCE TO RELATED APPLICATION

This application is the US national phase of International Patent Application No. PCT/IB2022/058223, filed Sep. 1, 2022, which claims priority to Bulgarian Application No. 5374, filed Sep. 3, 2021. The priority application, BG 5374, is hereby incorporated by reference in its entirety.

TECHNICAL FIELD

The invention refers to a compact functional package built of usable components complementing the functionality, without the use of waste materials, which may find application in computer peripherals and mobile electronics.

PRIOR ART

A system for protecting an electronic device in the form of a packaging package, described in US patent US 2017/0210535 A1, is known, which comprises an outer body made up of two parts with free volume for a device, which form the overall dimensions of the packaging package, containing a packaging body, forming a receptacle for accessories.

A disadvantage of this system is the presence of high amount of waste materials, which create prerequisites for environmental pollution.

SUMMARY OF THE INVENTION

The object of the present invention is to create a packaging system for electronic device built of usable components complementing the functionality that eliminates the need for standard packaging package.

This object is achieved by creating a compact and functional system of usable components functioning as packaging package, interacting with each other in a way that makes assembly/disassembly of the package possible without harming the functionality of the components, as well as preserving the electronic device in a complete and protected form in the process of its transportation.

In order to minimize the total number of parts when assembling the individual functional packaging products, maximally unified components, which are assembled in all packaging products, have been created.

According to the invention, the functional packaging system is built without unusable after unpacking materials. More specifically, the electronic device packaging system built of usable components complementing the functionality of the device comprises geometrically connected first connecting element comprising a sound reproduction means connected to one side of an intermediate connecting element being a flat and flexible component which at its other side is connected to a second connecting element, which is a housing of a device for charging an electronic device. The intermediate connecting element is arranged around a space for accommodation of the electronic device and in a bent position is secured to the bottom of the first connecting element and to the ceiling of the second connecting element.

All elements can be connected by various types of known fits, for example, the connection between the first, intermediate and second connecting elements of the system can be made by means of grooves formed for the purpose on the bottom of the first connecting element and on the ceiling of the second connecting element, in which the intermediate connecting element is placed in a bent position. Alternatively, the elements may be temporarily glued to each other by a known type of adhesive such as double-sided tape.

The sound reproduction means may be a sound device, such as loudspeaker, or an alternative device for reproducing sound signal, such as one or two headphones in a headphone box. The headphone box can serve only to store the headphones, or it can also be their charger.

The flat and flexible component can be used as accessory for peripherals, and be, for example, a mouse pad.

The electronic device charger may be a wireless electronic device charger, or a vertical stand for an electronic device with charging via a physical interface for charging or data transmission (e.g. via a USB port).

Preferably, the entire set of the product is wrapped with stretch film for complete protection during its transportation.

The system, according to the useful model, is more environmentally friendly and it minimizes the disposal of waste products in nature.

DESCRIPTION OF THE ATTACHED FIGURES

EXAMPLE OF EMBODIMENT AND OPERATION OF THE INVENTION

Figure 1:
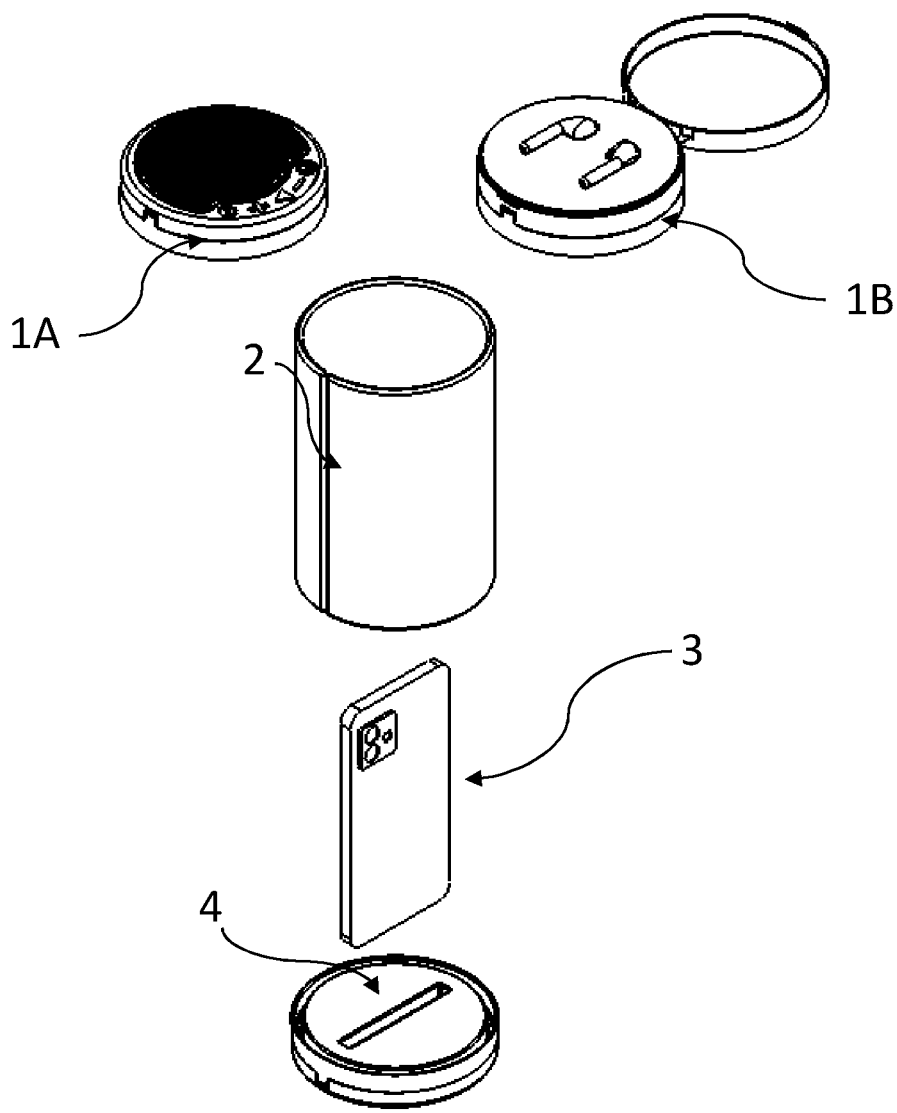
FIG. 1 is an exploded perspective view of the proposed electronic device packaging system built of usable components complementing the functionality, according to a preferred embodiment of the invention.
Figure 2:
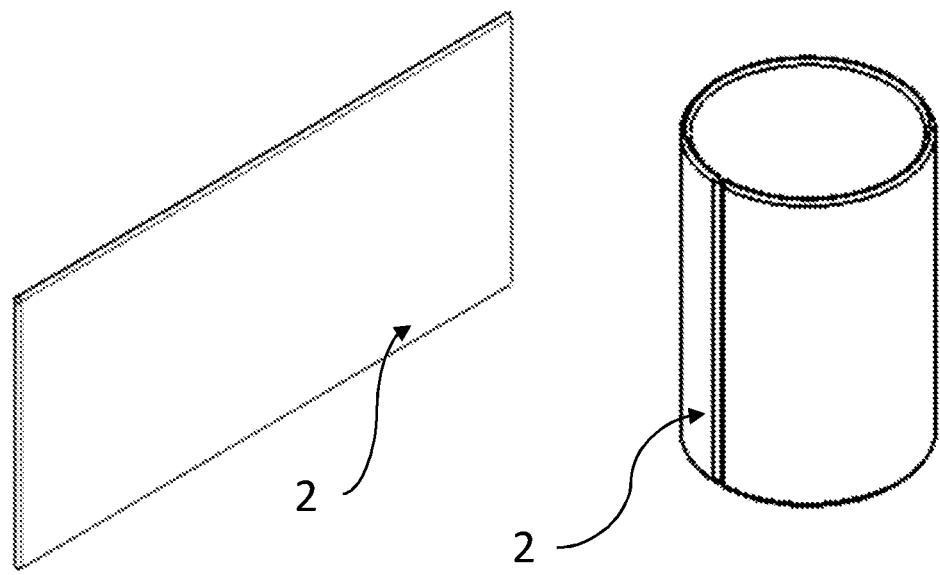
FIG. 2 is an isometric view of a pad for peripheral device, according to the invention, both in an unfolded and bent state.
Figure 3:
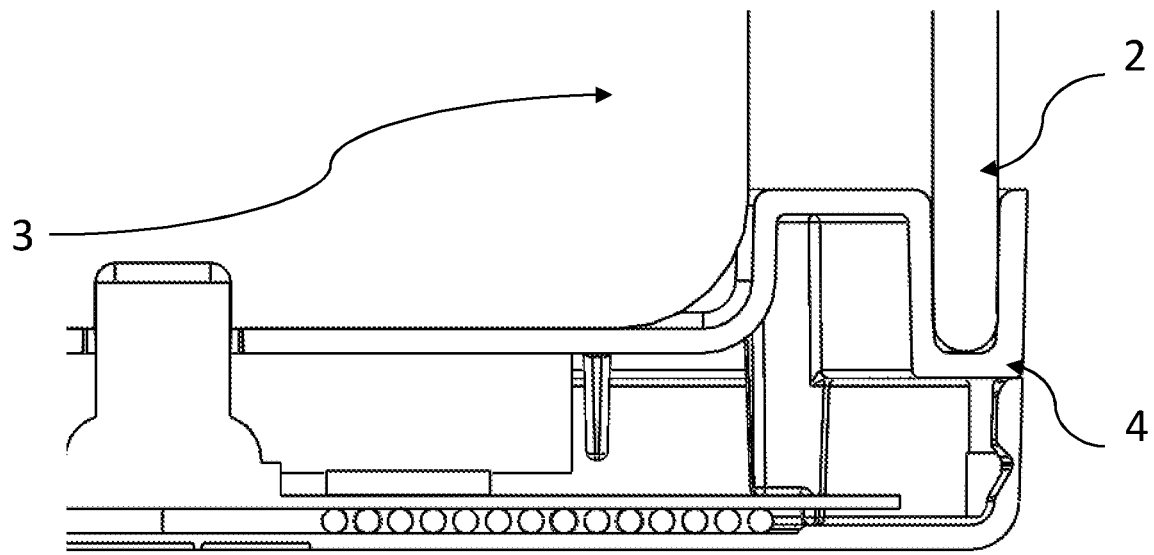
FIG. 3 is a partial sectional view of the lower portion of the electronic device packaging system, according to the invention, showing the connection of the electronic device to the charging device.

The exemplary embodiment of the electronic device packaging system built of usable components complementing the functionality, according to the invention, comprises:

A sound reproduction means, which is loudspeaker 1A and/or headphones 1B, and which housing serves as the first connecting element from the packaging system to the electronic device 3 and the flat and flexible component 2. Accordingly, said housing can be a loudspeaker housing, a box for headphones, or both. In a preferred embodiment, the first connecting element is disc-shaped, but can also be of another shape, for example a cube, parallelepiped, pyramid or other, as long as it fits in shape with the other elements of the packaging system, and can be assembled with them;

Charging device 4 of an electronic device 3, the housing of which is preferably shaped as a disk-shaped second connecting element of the packaging system for the electronic device 3 and the flat and flexible component 2;

Flat and flexible component 2, a mouse pad, which serves as an intermediate connecting element of the packaging system for the electronic device 3. In bent position, the flat and flexible component 2 fulfills its function of "packaging", being in the form of a hollow cylinder, in which the electronic device 3 is placed. The connection between the first, the intermediate and the second connecting elements of the system can be made by grooves formed for the purpose on the bottom of the first connecting element and on the ceiling of the second connecting element, in which the intermediate connecting element is placed in a bent position. Alternatively, the elements may be temporarily glued to each other by a known type of adhesive such as double-sided tape. In unfolded position, the flat and flexible component 2 fulfills its working function of a pad for peripheral computer device, for example, mouse. Alternatively, it is possible for the flat and flexible component 2 to be, for example, an advertising panel.

In assembled state, all elements can be additionally wrapped in stretch film to preserve their wholeness during transportation.

The reference numbers of the technical features are included in the claims solely for the purpose of increasing the comprehensibility of the claims and, therefore, these reference numbers do not have any limiting effect on the interpretation of the elements indicated by these reference numbers.

The invention claimed is:

1. A packaging system for an electronic device built of usable components complementing the functionality of the device, said packaging system comprising a geometrically connected first connecting element, comprising a sound reproduction means, connected to one side of an intermediate connecting element which at its other side is connected to a second connecting element, which is housing a device for charging said electronic device, wherein the intermediate connecting element is made from a flat and flexible component, which in a bent position is arranged around a space for accommodation of the electronic device and is secured to a bottom of the first connecting element and to a ceiling of the second connecting element.

2. The packaging system for electronic device according to claim 1, the intermediate connecting element disposed in grooves formed on the bottom of the first connecting element and on the ceiling of the second connecting element.

3. The packaging system for electronic device according to claim 1, the sound reproduction means being a loudspeaker.

4. The packaging system for electronic device according to claim 1, the sound reproduction means including at least one headphone.

5. The packaging system for electronic device according to claim 1, the intermediate connecting element being a mouse pad.

* * * * *